(12) United States Patent
Fujii et al.

(10) Patent No.: US 12,611,725 B2
(45) Date of Patent: Apr. 28, 2026

(54) DISSIMILAR MATERIAL SOLID-PHASE BONDING METHOD AND DISSIMILAR MATERIAL SOLID-PHASE BONDED STRUCTURE

(71) Applicant: OSAKA UNIVERSITY, Osaka (JP)

(72) Inventors: Hidetoshi Fujii, Osaka (JP); Yoshiaki Morisada, Osaka (JP); Kohsaku Ushioda, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 100 days.

(21) Appl. No.: 18/280,702

(22) PCT Filed: Mar. 1, 2022

(86) PCT No.: PCT/JP2022/008554
§ 371 (c)(1),
(2) Date: Sep. 7, 2023

(87) PCT Pub. No.: WO2022/190956
PCT Pub. Date: Sep. 15, 2022

(65) Prior Publication Data
US 2024/0293888 A1 Sep. 5, 2024

(30) Foreign Application Priority Data
Mar. 9, 2021 (JP) ................................. 2021-037269

(51) Int. Cl.
B23K 11/00 (2006.01)
B32B 15/01 (2006.01)

(52) U.S. Cl.
CPC .......... B23K 11/002 (2013.01); B32B 15/012 (2013.01)

(58) Field of Classification Search
CPC ..... B23K 11/002; B23K 11/115; B23K 11/20; B32B 15/012
See application file for complete search history.

(56) References Cited

U.S. PATENT DOCUMENTS 9,839,971 B2 * 12/2017 Schroth .................. B23K 11/34
2021/0107087 A1 * 4/2021 Fujii .................... B23K 20/227
(Continued)

FOREIGN PATENT DOCUMENTS

CA 3057576 A1 * 10/2018 ............. B23K 11/16
EP 4011540 A1 * 6/2022 ............. B23K 20/00
(Continued)

*Primary Examiner* — Woody A Lee, Jr.
(74) *Attorney, Agent, or Firm* — RANKIN, HILL & CLARK LLP

(57) ABSTRACT

The present invention provides dissimilar material solid-phase bonding that efficiently forms a robust bonded portion of metal materials having different compositions and/or structures. The present invention is a solid-phase bonding method in which one member is brought into contact with another member to form an interface to be bonded, and a bonding load is applied, thereby forming newly-generated surfaces of the one member and the other member at the interface to be bonded, wherein the one member and the other member are brought into contact to form the interface to be bonded, the temperature of the interface to be bonded is raised using ohmic heating by running current from the one member to the other member, the one member and the other member are combined while having different electrical resistances, the temperature ($T_1$) of the one member and the temperature ($T_2$) of the other member in the vicinity of the interface to be bonded are set so as to differ from one another, the one member and the other member have approximately the same strength at the temperature ($T_1$) of the one member and the temperature ($T_2$) of the other member, and a bonding load for which a bonding pressure corresponding to said strength is applied is set substantially perpendicular to the interface to be bonded.

8 Claims, 14 Drawing Sheets

(56) References Cited

U.S. PATENT DOCUMENTS

2022/0126390 A1* 4/2022 Haselhuhn ............ B32B 15/011
2022/0402065 A1* 12/2022 Ramirez ............... B32B 15/012

FOREIGN PATENT DOCUMENTS

WO    WO-2011099160 A1 * 8/2011 ........... B32B 15/015
WO    WO-2019181360 A1 * 9/2019 ........... B23K 20/023
WO    WO-2020053736 A1 * 3/2020 ............. B23K 11/11

* cited by examiner

5mm

DISSIMILAR MATERIAL SOLID-PHASE BONDING METHOD AND DISSIMILAR MATERIAL SOLID-PHASE BONDED STRUCTURE

TECHNICAL FIELD

The present invention relates to a dissimilar material solid phase bonding method for solid phase bonding between metal materials and a dissimilar material solid phase bonding structure obtained by the dissimilar material solid phase bonding method.

BACKGROUND ART

With the increase in strength of metal materials such as steel and aluminum alloys, the decrease in strength at the bonded portion that determine the mechanical properties of the bonding structure has become a serious problem. On the other hand, in recent years, attention has been paid to a solid phase bonding method in which the maximum temperature reached during bonding does not reach the melting point of the material to be bonded and the decrease in strength at the bonded portion is smaller than that of conventional melt welding, and it is rapidly progressing to put into practical use.

In particular, "friction pressure welding" in which a rotating columnar material to be bonded is pressed against a fixed material to be bonded and "linear friction welding" in which the material to be bonded is reciprocated in contact with the other material to be bonded are used. Since it does not require a tool for press-fitting into the material to be bonded unlike friction stir welding, it can be easily applied to high melting point and high strength metals such as steel and titanium.

In addition, the present inventors have proposed a bonding method capable of accurately controlling the bonding temperature by the applied pressure at the time of bonding, and have succeeded in significantly lowering the bonding temperature. For example, Patent Document 1 (International Publication No. 2017/022184) discloses a friction welding method where surfaces to be bonded of two metal members to be bonded are made slide in contact with each other, wherein; at least one of the metal members to be bonded is a ferrous material, and a maximum temperature reached during bonding is equal to or less than the $A_3$ point or equal to or less than the $A_{cm}$ point of the ferrous material.

The conventional frictional bonding is a bonding method using frictional heat, but in the frictional bonding method described in Patent Document 1, by positively utilizing the processing heat generated by the plastic deformation of the metal materials to be bonded, a good bonding can be obtained even at a low bonding temperature.

Further, Patent Document 2 (Japanese Unexamined Patent Publication No. 2018-122344) discloses a linear friction welding method, comprising: a first step of forming the interface to be welded by bringing one member into contact with the other member, a second step of repeatedly sliding the one member and the other member on the same locus while applying a pressure substantially perpendicular to the interface to be welded, and discharging flash from the interface to be welded, a third step of forming a welding surface by stopping the sliding, wherein; setting the pressure to be greater than or equal to the yield stress and less than or equal to the tensile strength of the one member and/or the other member at the desired welding temperature.

In the linear friction welding method described in Patent Document 2, the relationship between the yield strength and the temperature is substantially constant depending on the material, and the temperature can be controlled extremely accurately by the applied pressure for discharging burrs from the interface to be bonded.

PRIOR ART REFERENCE

Patent Reference

Patent Reference 1: WO2017/022184
Patent Reference 2: JP2018-122344A

SUMMARY OF THE INVENTION

Problem to be Solved by the Invention

However, an appropriate bonding method has not been established for dissimilar material bonding, which often forms fragile intermetallic compounds at the bonding interface in addition to different physical properties, and the merits of the sold phase bonding method that can control and lower the bonding temperature have not been fully enjoyed. Further, even when an intermetallic compound is not formed at the bonding interface, if the deformation behavior in the vicinity of the interface to be bonded is different during solid phase bonding, for example, when steel materials having different compositions are bonded, it is difficult to obtain a good bonded portion by solid phase bonding.

Further, in bonding dissimilar materials, it is effective to deform both materials to be bonded at the bonding interface and achieve metallurgical bonding by bringing the newly generated surfaces into contact with each other. However, when one member to be bonded and the other member to be bonded have different strengths, in all temperature ranges, it is extremely difficult to achieve this bonding according to the conventional bonding method.

In view of the above problems in the prior art, an object of the present invention is to provide a dissimilar solid phase bonding capable of efficiently forming a strong bonded portion of metal materials having different compositions and/or structures. Another object of the present invention is to provide a dissimilar solid phase bonded structure having a dissimilar solid phase bonded portion in which metal materials having different compositions and/or structures are firmly bonded.

Means to Solve the Problems

In order to achieve the above object, the present inventor has done intensive study as to deformation behavior of the interface to be bonded in the vicinity of the interface to be bonded during solid phase bonding of dissimilar materials by using ohmic heating, and have found that it is extremely important to control the temperatures of the materials to be bonded in the vicinity of the interface to be bonded by utilizing the difference of the electrical resistances of the materials to be bonded, and the like, and have reached the present invention.

Namely, the present invention can provide a dissimilar material solid phase bonding method where one member is brought into contact with another member to form an interface to be bonded, and newly formed surfaces of the one member and the other member are formed at the interface to be bonded, by means of the application of a bonding load, characterized in that:

the one member and the other member are brought into contact to form the interface to be bonded, the temperature of the interface to be bonded is raised by using ohmic heating by running current from the one member to the other member, the combination of the one member and the other member is different in electrical resistance, the temperature $(T_1)$ of the one member and the temperature $(T_2)$ of the other member in the vicinity of the interface to be bonded are set so as to differ from one another, the one member and the other member have substantially the same strength at the temperature $(T_1)$ of the one member and the temperature $(T_2)$ of the other member, and the bonding load which applies the strength substantially perpendicular to the interface to be bonded is set.

Here, when the one member and the other member have the "temperature having substantially the same strength", by setting the bonding temperature to that temperature, the one member and the other member in the vicinity of the interface to be bonded can be sufficiently deformed in the vicinity of the interface to be bonded to form a good solid phase bonding interface at which the newly generated surfaces are in contact with each other. However, when there is no "temperature having substantially the same strength" for the one member and the other member, the weaker member deforms at the set bonding temperature, and a good solid phase at which the newly formed surfaces are in contact with each other cannot be obtained.

That is, when there is no "temperature having substantially the same strength" for the one member and the other member, in the solid phase bonding method that utilizes frictional heat such as friction welding and linear friction welding, since the temperatures of the one member and the other member in the vicinity of the interface to be bonded during the bonding are inevitably the same, a good bonding cannot be obtained. On the other hand, in the dissimilar material solid phase bonding method of the present invention, since the electrical resistances of the one member and the other member are different, it is possible to realize the state that "the temperature $(T_1)$ of the one member and the temperature $(T_2)$ of the other member in the vicinity of the interface to be bonded are set so as to differ from one another, and the one member and the other member have substantially the same strength at the temperature $(T_1)$ of the one member and the temperature $(T_2)$ of the other member" by utilizing the temperature difference in the vicinity of the interface to be bonded due to the difference in electrical resistance and the temperature dependence of the strength of each member and selecting appropriate members as the materials to be bonded.

Further, even when there is the "temperature having substantially the same strength" in the one member and the other member, when the temperature is high, it is inevitable to form a softened region and a fragile thick intermetallic compound layer in the bonding, and the like. In such a case, it is possible to adjust the temperature $(T_1)$ and/or the temperature $(T_2)$ lower in the state that "the temperature $(T_1)$ of the one member and the temperature $(T_2)$ of the other member in the vicinity of the interface to be bonded are set so as to differ from one another, and the one member and the other member have substantially the same strength at the temperature $(T_1)$ of the one member and the temperature $(T_2)$ of the other member."

Here, substantially the same strength does not mean that the strengths are completely the same, and it may be a strength range in which the formation of the new surfaces at the interface to be bonded proceeds to the same extent. Further, when the shape and/or size of the one member and the other member are different, since the heat conduction is different, the deformation behaviors in the vicinity of the interface to be bonded are different (for example, it is expected that the temperature of the larger member will drop slightly). Therefore, a difference of around 100 MPa is allowed for "substantially the same strength".

In the dissimilar material solid phase bonding method of the present invention, it is necessary to accurately control the bonding temperature, and the object can be achieved by appropriately setting the bonding load applied substantially perpendicular to the interface to be bonded. Since in the vicinity of the interface to be bonded, the softened material becomes burrs and is continuously discharged, the "bonding temperature" is determined by the pressure (force to discharge burrs) which is applied to the softened material. That is, when the applied pressure is set high, the material to be bonded with higher strength (state with high yield strength) can be discharged as burrs. Here, since the "state with higher yield strength" means the "state with lower temperature", the "bonding temperature" decreases as the applied pressure increases. Since the relationship between the yield strength and the temperature is substantially constant depending on the material, the bonding temperature can be controlled extremely accurately.

That is, the bonding temperature can be controlled by setting the pressure at the time of solid phase bonding to be equal to or higher than the yield stress of the materials to be bonded and equal to or lower than the tensile strength at a desired bonding temperature. Here, when the pressure at the time of solid phase bonding is set to be equal to or higher than the yield stress of the material to be bonded, the discharge of burrs from the interface to be bonded is started, and when the pressure is increased up to the tensile strength, the discharge of burrs is accelerated. Similar to the yield stress, since the tensile strength at a specific temperature is substantially constant depending on the material to be bonded, the bonding temperature corresponding to the set pressure can be realized.

Though the pressure applied during bonding may be optionally finely adjusted according to the size and shape of the material to be bonded from the viewpoint of the actually obtained bonding temperature, it is preferable to set the yield stress of the materials to be bonded at the desired bonding temperature. In solid phase bonding, the discharge of burrs starts at the moment when the pressure reaches the yield stress, the desired bonding temperature can be realized more accurately in comparison with the case when the pressure is set to a higher value (up to the tensile strength).

Here, even when the difference in electrical resistance between the one member and the other member is utilized, there is a case where the one member and the other member cannot be brought into the appropriate temperature $(T_1)$ and temperature $(T_2)$, respectively. In this case, for example, the temperature $(T_1)$ and the temperature $(T_2)$ can be controlled by adjusting the shape and size of the one member and the other member in consideration of the energization path.

In the dissimilar material solid phase bonding method of the present invention, it is preferable that the current density $(D_1)$ for the one member and the current density $(D_2)$ for the other member are set to different values in the ohmic heating. When increasing the temperature rising rate, the current density is set to a high value, and when decreasing the temperature rising rate, the current density is set to a low value, thereby the temperature $(T_1)$ of the one member and the temperature ($T_2$) of the other member can be controlled more freely. The method for changing the current density is not particularly limited as long as it the effects of the present invention is not impaired, and various conventionally known methods can be used, for example, in case that bar members are bonded to each other, it can be realized by narrowing the member which current density is increased.

Further, in the dissimilar material solid phase bonding method of the present invention, it is preferable that the length ($L_1$) of the one member and the length ($L_2$) of the other member are set to different values. By lengthening the member, the Joule heat generated by energization can be increased. Further, the distance between the vicinity of the interface to be bonded and the fixing jig can be increased, and the heat dissipation from the vicinity of the interface to be bonded can be suppressed. Using these, the temperature ($T_1$) of the one member and the temperature ($T_2$) of the other member can be more freely controlled.

Further, in dissimilar material solid phase bonding method of the present invention, it is preferable that the tip portion of the one member and/or the tip portion of the other member have a tapered shape, and the interface to be bonded is formed by the contact between the tip portions. By tapering the tip portion, the current density in the region can be increased and the temperature can be efficiently raised. In addition, the application of the bonding pressure can promote the deformation of the tip portion (vicinity of the interface to be bonded), and the amount of deformation can be increased. Here, for example, when the material to be bonded is a round bar, by making the tip portion having the tapered shape being substantially the diameter of the round bar, it is possible to make the diameters of the bonding portion and the material to be bonded the same.

Further, in the dissimilar material solid phase bonding method of the present invention, it is preferable that the area ($S_1$) of the one member and the area ($S_2$) of the other member on the surface forming the interface to be bonded are set to different values. Since the current density at the time of the energization changes depending on the cross-sectional area of the material to be bonded, by using the change, the temperature ($T_1$) of one member and the temperature ($T_2$) of the other member can be more freely controlled.

Further, in the dissimilar material solid phase bonding of the present invention, it is preferable to set the burn-off length so that the new surfaces of the one member and the other member are formed in substantially the entire area of the interface to be bonded in the one member and/or the other member. In the dissimilar material solid phase bonding of the present invention, the bonding is obtained by abutting the new surfaces of the materials to be bonded, and in the one member and/or the other member, by forming the new surfaces in substantially the entire area of the interface to be bonded, a good bonding is formed. Here, more preferably, it is desirable that the new surface is formed over the entire interface to be bonded in both the one member and the other member. By bringing the new surfaces of the one member and the other member into contact with each other, it is possible to obtain a strong bonded portion using all the new surfaces generated during the bonding. Here, it is most preferable to stop the increase in the burn-off length at the timing when the new surface is formed over the entire interface to be bonded in both members. By stopping the increase in the burn-off length at this timing, it is possible to obtain a good bonding in which the entire area of the interface to be bonded is bonded by the contact between the new surfaces. Here, by making the total of the surface area of the discharged burrs and the increase area in the interface to be bonded increased due to the deformation of the material to be bonded approximately twice the area of the interface to be bonded before bonding, it is possible to form the new surface over the entire interface to be bonded.

Further, in the dissimilar material solid phase bonding method of the present invention, it is preferable to create the temperature $T_1$ and/or the temperature $T_2$ by subjecting the one member and/or the other member to external cooling and/or external heating. By subjecting to the external cooling and/or external heating, it is possible to adjust the strength of the one member or the other member in the vicinity of the interface to be bonded, and it is possible to make the strengths of the one member and the other member substantially the same.

Further, the present invention provides a dissimilar material bonded structure characterized in that:

there is a solid phase bonded portion where the one member and the other member are integrated via a solid phase bonded interface, the one member and the other member have different electrical resistances, there is no temperature at which the strength of the one member and the other member becomes substantially the same, and the one member and the other member are both deformed in the vicinity of the solid phase bonded interface.

Here, regarding the region where the one member and the other member are deformed in the vicinity of the solid phase bonded interface, if the region is removed by cutting or the like, it is naturally included in the scope of the dissimilar material bonded structure of the present invention. The removal of the deformed portion by cutting or the like can be easily determined by observing the microstructure or the like of the region.

When there is no temperature at which the strength of the one member and the other member becomes substantially the same, though the conventional bonding method cannot deform them together to form a bonded portion, it is possible to obtain dissimilar material bonded structure having the bonded portion where the one member and the other member are both deformed in the vicinity of the solid phase bonded interface by using the dissimilar material solid phase bonding method of the present invention.

In the dissimilar material solid bonded structure of the present invention, it is preferable that the thickness of the intermetallic compound formed in the outer peripheral portion is within ±20% of the thickness of the intermetallic compound formed in the central portion in the solid phase bonded interface. In the case of a combination in which the one member and the other member form a brittle intermetallic compound, it is important to form a uniform and thin intermetallic compound layer in order to obtain a bonded portion with high strength and reliability. Here, when setting the thickness of the intermetallic compound formed in the outer peripheral portion within ±20% of the thickness of the intermetallic compound formed in the central portion, sufficient strength and reliability can be ensured. The thickness difference of the intermetallic compound layers is more preferably within ±15%, and most preferably within ±10%. The absolute value of the thickness of the intermetallic compound layer is preferably 5 µm or less, more preferably 4 µm or less, and most preferably 1 µm or less.

Further, in the dissimilar material bonded structure of the present invention, it is preferable that the one member is a steel material and the other member is an aluminum alloy material. In addition to that fact that there is no temperature at which the strengths of steel and aluminum alloy becomes substantially the same, the combination is attracting attention for the purpose of reducing the weight of transportation equipment. When the steel material and the aluminum alloy are bonded by a conventional solid phase bonding method, only the aluminum alloy side is deformed in the vicinity of the interface to be bonded, but it is possible to obtain the dissimilar material bonded structure having bonded portion in which both the steel material and the aluminum alloy are deformed in the vicinity of the solid phase bonded interface.

Advantageous Effects of Invention

According to the present invention, it is possible to provide a dissimilar solid phase bonding capable of efficiently forming a strong bonded portion of metal materials having different compositions and/or structures. Further the present invention can provide a dissimilar solid phase bonded structure having a dissimilar solid phase bonded portion in which metal materials having different compositions and/or structures are firmly bonded.

MODE FOR CARRYING OUT THE INVENTION

In the following, by referring the drawings, as the typical embodiments of the dissimilar material solid phase bonding method and the dissimilar material bonding structure of the present invention is explained in detail, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Dissimilar Material Solid Phase Bonding Method

The dissimilar material solid phase bonding method of the present invention includes a first step of forming an interface to be bonded and applying a pressure necessary for bonding, and a second step of raising a temperature of the interface to be bonded. Each step will be described in detail below.

(1-1) First Step (Pressure Applying Step)

In the first step, the interface to be bonded is formed and a pressure necessary for bonding is applied to determine a bonding temperature. In the fusion welding where the materials to be bonded are melted, the pressure applied to the materials to be bonded is intended to bring the materials to be bonded into close contact with each other, and the pressure does not affect the bonding temperature. On the other hand, when bonding is performed in a solid phase without melting in the vicinity of the interface to be bonded, the bonding temperature can be accurately determined by the pressure.

Figure 1:
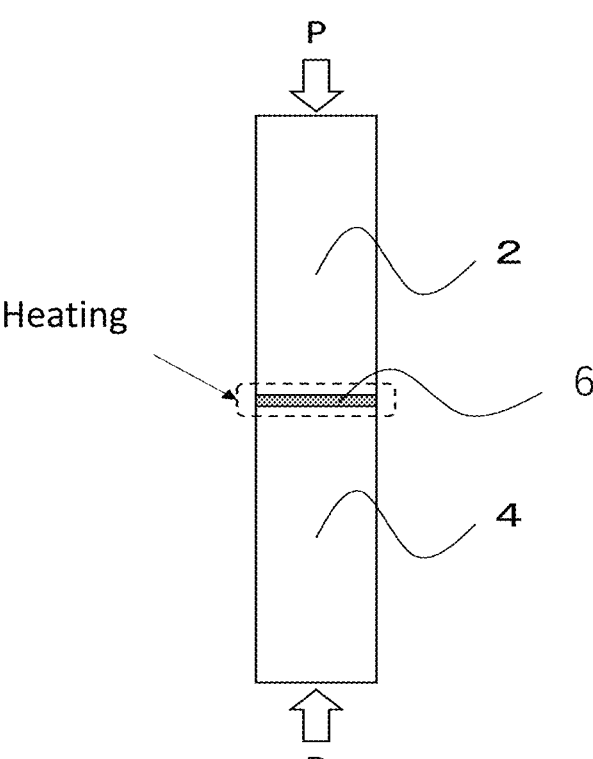
FIG. 1 is a schematic diagram of the dissimilar material solid phase bonding method according to the present invention.

FIG. 1 shows a schematic diagram of the dissimilar material solid phase bonding method of the present invention. One member 2 and the other member are made of different materials (different in composition and/or structure) and have different electrical resistances. In the first step, after the one member 2 and the other member 4 are brought into contact with each other to form the interface 6 to be bonded, a pressure P which is equal to or higher than the yield strength of the one member 2 and the other member 4 at the temperature ($T_1$) and the temperature ($T_2$) is applied in a substantially vertical direction to the interface 6 to be bonded. Here, the yield strengths of the one member 2 and the other member 4 at the temperature ($T_1$) and the temperature ($T_2$) are substantially the same.

The end surfaces of the one member 2 and the other member 4 that form the interface 6 to be bonded may be subjected to cutting or the like, but it is preferable that the surfaces are smoothed, for example, preferably to be buffed or the like. By bringing the end surfaces into close contact with each other, it is possible to suppress the formation of defects (unbonded portions) at the bonded interface. On the other hand, from the viewpoint of heat generation due to energization, the end surfaces of the one member 2 and the other member 4 may be formed with minute unevenness.

The bonding temperature can be controlled by setting the pressure P to equal to or higher than the yield stress of the one member 2 and the other member and 4. Here, when the pressure P is set to equal to or higher than the yield stress of the material to be bonded, the deformation of the vicinity of the interface 6 to be bonded and the discharge of burrs are started, and when the pressure P is increased more, the deformation and the discharge of burrs is accelerated. Since the yield stress at a specific temperature is substantially constant depending on the material to be bonded, the bonding temperature corresponding to the set pressure P can be realized.

Figure 2:
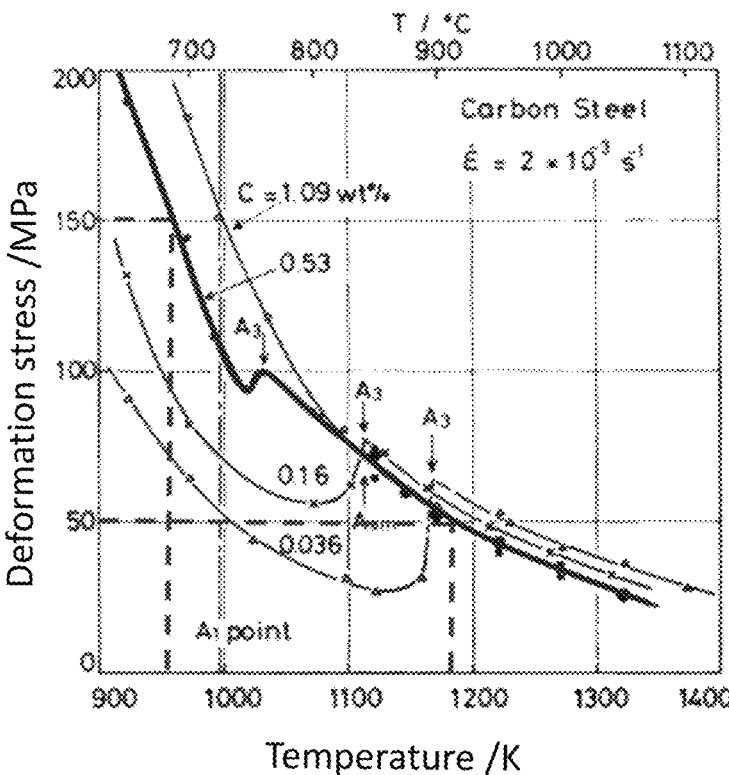
FIG. 2 is a graph showing the deformation stress (yield stress) of the carbon steel in each temperature.

As a specific example, FIG. 2 shows the deformation stress (yield stress) of the carbon steel at each temperature. FIG. 2 is a graph published in "Iron and Steel, No. 11, the $67^{th}$ year (1981), p. 140". As shown in FIG. 2, the yield stress at a specific temperature is substantially constant depending on the material.

That is, when the pressure P at the time of bonding is set high, the material to be bonded having higher yield strength can be deformed, and the bonding temperature can be lowered. Further, as shown in FIG. 2, since the yield stress at a specific temperature is substantially constant depending on the material, the bonding temperature can be controlled extremely accurately. For example, in case that the carbon content is 0.53 wt %, when the pressure P is 150 MPa, the temperature can be 950° C., and when the pressure is 50 MPa, the temperature can be 1180° C.

The materials of the one member 2 and the other member 4 are a combination of different electrical resistances, and are not particularly limited as long as the temperature at which the strength becomes substantially the same can be created by ohmic heating, and for example, the one member 2 is made of steel and the other member 4 is made of an aluminum alloy, or the one member 2 is made of copper or a copper alloy and the other member is made of aluminum or an aluminum alloy. Here, the electrical resistance may be the value measured at room temperature for the actually used materials to be bonded, and generally known values are iron: $1.0 \times 10^{-7}$ Ωm, aluminum: $2.7 \times 10^{-8}$ Ωm, copper: $1.7 \times 10^{-8}$ Ωm.

Further, the shape and size of the one member 2 and the other member 4 are not particularly limited as long as the effects of the present invention are not impaired, and the desired pressurization, temperature rise, and the like can be realized by the bonding apparatus, but it is preferable to make the area of the interface 6 to be bonded smaller than the cross-sectional area of the one member 2 and/or the other member 4. By making the area of the interface 6 to be bonded relatively small, in the second step, the current density can be increased and, in addition thereto, the temperature distribution of the interface 6 to be bonded can be made more uniform.

(1-2) Second Step

The second step is a step of heating the vicinity of the interface 6 to be bonded to the bonding temperature by ohmic heating while the pressure P is applied substantially perpendicularly to the interface 6 to be bonded.

More specifically, the second step is a step for realizing the state that "the temperature $(T_1)$ of the one member and the temperature $(T_2)$ of the other member in the vicinity of the interface to be bonded are set so as to differ from one another, and the one member and the other member have substantially the same strength at the temperature $(T_1)$ of the one member and the temperature $(T_2)$ of the other member", by adjusting the difference in electrical resistance, shape, size, and the like between the one member 2 and the other member 4. Here, though it is preferable that the temperature $(T_1)$ and the temperature $(T_2)$ are realized at the same timing, it is sufficient if these temperatures are realized during the bonding period of time.

More specifically, for example, when the one member 2 is desired to be heated faster than the other member 4, it is possible to achieve by increasing the current density due to reduction of the cross-sectional area of one member 2, and by increasing the amount of Joule heating and suppressing heat dissipation in the vicinity of the interface 6 to be bonded due to making the one member 2 longer. When the material to be bonded is a simple round bar, the Joule heat generated by energization is proportional to the length of the round bar and inversely proportional to the cross-sectional area. Further, by tapering the tip portion of the one member 2, it is possible to simultaneously achieve the increase in current density and the acceleration of the deformation.

Further, the current density used for ohmic heating is preferably 50 A/mm² or higher, more preferably 70 A/mm² or higher. In order to suppress the formation of a heat-affected zone in the bonded portion, it is preferable to shorten the bonding time, and a good joint can be obtained by rapidly raising the temperature of only the vicinity of the interface to be bonded by heating with the current density of 50 A/mm² or higher (more preferably 70 A/mm² or higher). Further, by covering and constraining the periphery of the material to be bonded other than the vicinity of the interface to be bonded with an electrically conductive body, and in addition thereto, by arranging an insulating body corresponding to the protrusion length between the electrically conductive bodies, it is possible to pass a current having a high current density only through the protrusion portion of the material to be bonded. The initial area $A_0$ of the interface to be bonded is preferably ⅒ or less of the area of the electrically conductive body, more preferably ⅓₀ or less.

In the dissimilar material solid phase bonding method of the present invention, it is necessary to set bonding parameters (bonding time, burn-off length, and the like) other than the pressure P and the bonding temperature, but these values are not limited as long as the effect of the present invention is not impaired, and may be appropriately set depending on the property, shape, size and the like of the material to be bonded.

Here, after the temperature of the interface 6 to be bonded reaches the desired bonding temperature $(T_1$ and $T_2)$, the timing of removing the pressure P may be appropriately set, and by removing the pressure after confirming the deformation of the vicinity of the interface 6 to be bonded and the discharge of burrs from the interface 6 to be bonded, a good joint can be obtained more reliably. In addition, a higher pressure may be applied at the end of the bonding process for the purpose of removing burrs and making the new surfaces contact more strongly.

In addition, if the vicinity of the interface 6 to be bonded reaches the desired bonding temperature $(T_1$ and $T_2)$, the timing of stopping the temperature rise by ohmic heating is not particularly limited, but it is preferable to stop immediately after reaching the bonding temperature. By shortening the heating time as much as possible, it is possible to suppress the formation of the heat-affected zone in the vicinity of the bonded interface.

(2) Dissimilar Material Bonded Structure

Figure 3:
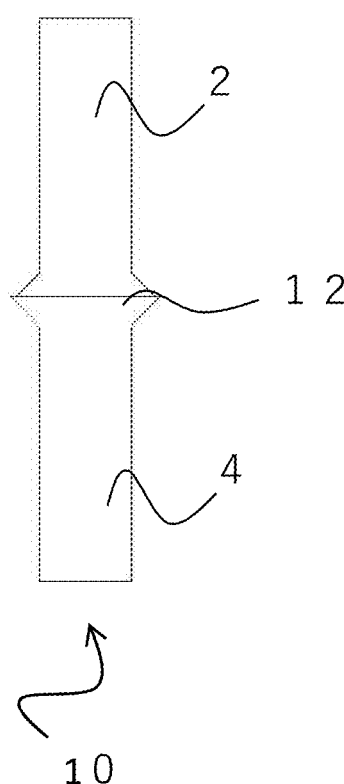
FIG. 3 is a schematic cross-sectional view showing an example of the dissimilar material bonded structure of the present invention.

FIG. 3 is a schematic sectional view which shows one example of the dissimilar material bonded structure of the present invention. The dissimilar material bonded structure 10 is one in which the one member 2 and the other member 4 having different electrical resistances are solid-phase bonded. Further, the one member 2 and the other member 4 do not have the temperature at which the strength becomes substantially the same. Here, "different electrical resistances" is a concept that broadly includes differences in physical property values due to the composition and structure of members and differences in values due to the size and shape of members.

The one member 2 and the other member 4 are metallurgically bonded through the solid phase bonded interface 12, with both members being deformed at the solid phase bonded portion. Further, it is preferable that the thickness of the intermetallic compound formed in the outer peripheral portion is within ±20% of the thickness of the intermetallic compound formed in the central portion in the solid phase bonded interface 12. When setting the thickness of the intermetallic compound formed in the outer peripheral portion within ±20% of the thickness of the intermetallic compound formed in the central portion, sufficient strength and reliability of the bonded portion can be ensured. The thickness difference of the intermetallic compound layers is more preferably within ±15%, and most preferably within ±10%. The absolute value of the thickness of the intermetallic compound layer is preferably 5 μm or less, more preferably 4 μm or less, and most preferably 1 μm or less.

Further, it is preferable that the one member 2 is a steel material and the other member 4 is an aluminum alloy material. In addition to that fact that there is no temperature at which the strengths of steel and aluminum alloy becomes substantially the same, the combination is attracting attention for the purpose of reducing the weight of transportation equipment. When the steel material and the aluminum alloy are bonded by a conventional solid phase bonding method, only the aluminum alloy side is deformed in the vicinity of the solid phase bonded interface 12, but in the dissimilar material bonded structure 10, in the vicinity of the solid phase bonded interface 12, despite the fact that the melting points differ by nearly 1000° C., both the steel material and the aluminum alloy have the deformed bonded portions. In the dissimilar material solid phase bonding method of the present invention, since metal materials having a large difference in melting points can be bonded in soli phase, it is preferable that melting point of the one member 2 differs from the melting point of the other member 4 by 800° C. or more.

Although the typical embodiments of the present invention have been described above, the present invention is not limited to these, and various design changes are possible, and all of these design changes are included in the technical scope of the present invention.

EXAMPLE

A carbon steel (S45C) material and an aluminum alloy (A5052-H34) material were used as the materials to be bonded. Both of them were round bars with a diameter of 10 mm, and the tip portion which forms the interface to be bonded had a diameter of 5.8 mm (the tip portion was tapered). The surfaces to be bonded were machined with a lathe and then degreased with acetone.

The electrical resistance of the carbon steel material is $1.6 \times 10^{-7}$ Ωm, and the electrical resistance of the aluminum alloy material is $0.5 \times 10^{-7}$ Ωm. That is, this is a combination where the carbon steel material side with high high-temperature strength is efficiently electrically heated, so that the temperature becomes higher. Further, since the thermal conductivity of the carbon steel is 50 W/m·K, and the thermal conductivity of the aluminum alloy is 140 W/m K, the heat can be removed lower to rise the temperature more efficiently. In addition, since the specific heat of the carbon steel material is 0.48 J/g·° C., and the specific heat of the aluminum alloy material is 0.88 J/g·° C., from the viewpoint of the specific heat, the carbon steel side can be efficiently heated.

Figure 4:
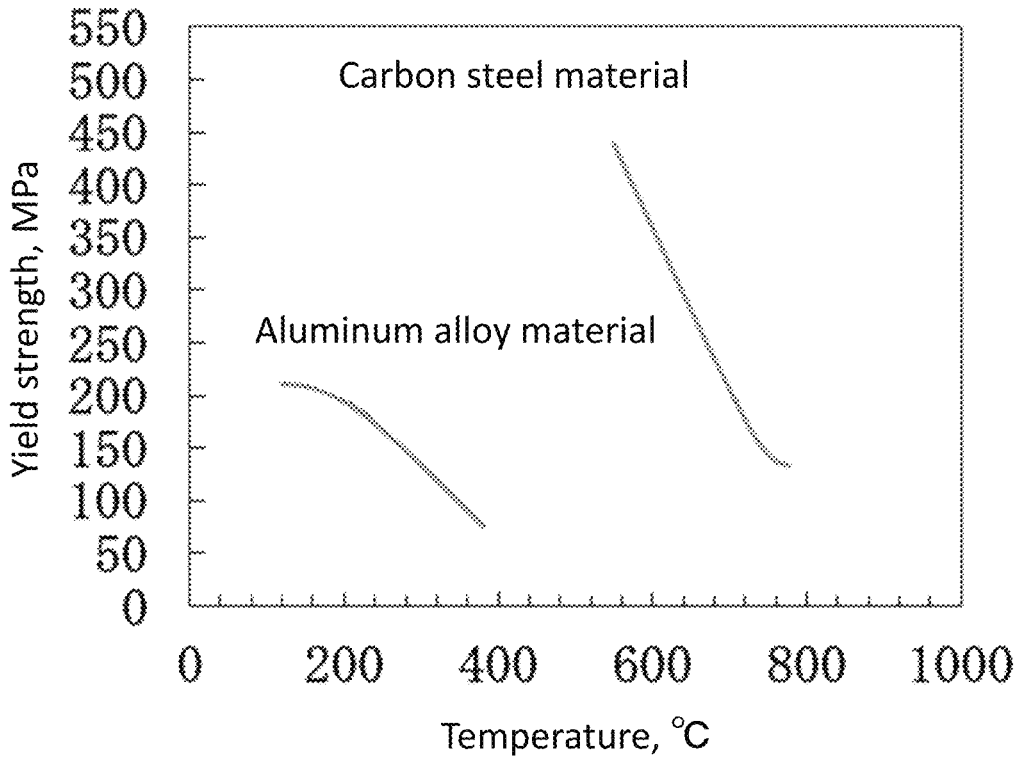
FIG. 4 is a graph showing the tensile strength of the carbon steel material and the aluminum alloy material at each temperature.

FIG. 4 shows the results of the high-temperature tensile test on the carbon steel material and the aluminum alloy material. As shown in FIG. 4, there is no temperature at which the carbon steel material and the aluminum alloy material have the same strength, and when the carbon steel material and the aluminum alloy material in the vicinity of the interface to be bonded have a uniform temperature, it is clear that they cannot be deformed together.

Figure 5:
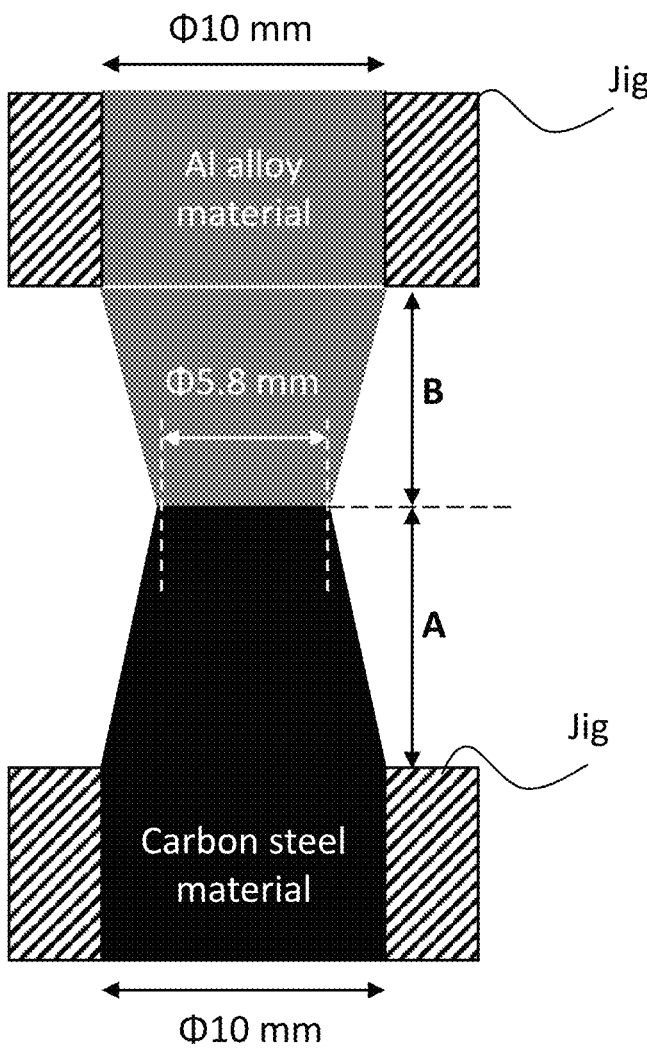
FIG. 5 is a schematic diagram showing a state in which the tip portions of the carbon steel material and the aluminum alloy material are butted against each other.

The tip portions of the carbon steel material and the aluminum alloy material were butted together in the state shown in FIG. 5 to form the interface to be bonded. Here, the tapered portion length A of the carbon steel material and the tapered portion length B of the aluminum alloy material shown in FIG. 5 are set to the values shown in Table 1, and then the amount of Joule heating at the ohmic heating was changed according to the shape of the tip portion of the materials to be bonded.

TABLE 1

|  | A (mm) | B (mm) | Increasing rate of interface to be bonded (%) |
|---|---|---|---|
| Condition 1 | 6 | 5 | 193 |
| Condition 2 | 7 | 4 | 220 |
| Condition 3 | 8 | 3 | 254 |

At the ohmic heating, a current of 5000 A was passed from the aluminum alloy material side to the carbon steel material side. In this state, from the viewpoint of current density, the current value of the interface to be bonded with a diameter of 5.8 mm is equivalent to 15000 A. Further, a bonding pressure of 180 MPa was applied perpendicularly to the interface to be bonded (butting surface) before the energization, and the bonding was finished when the burn-off length reached 7 mm.

Figure 6:
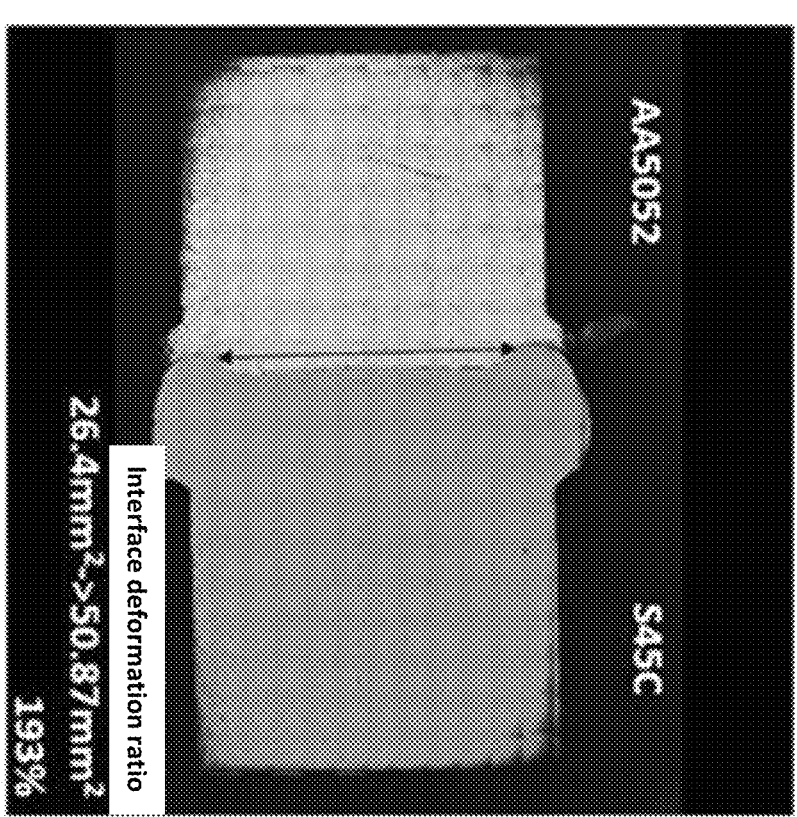
FIG. 6 is a cross-sectional photograph of the bonded portion obtained under Condition 1.
Figure 7:
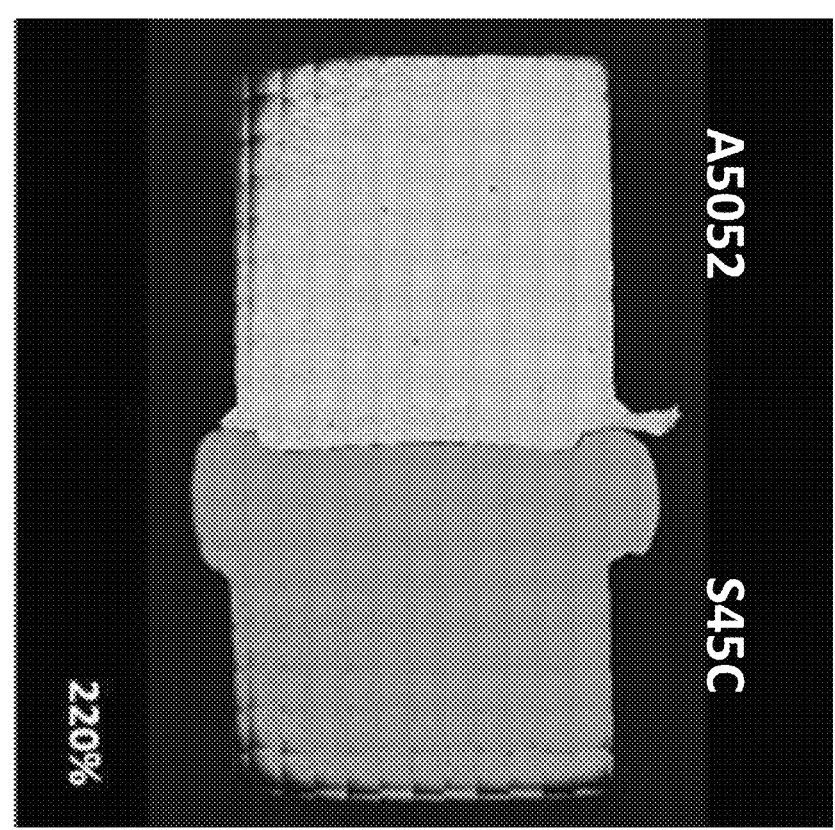
FIG. 7 is a cross-sectional photograph of the bonded portion obtained under Condition 2.
Figure 8:
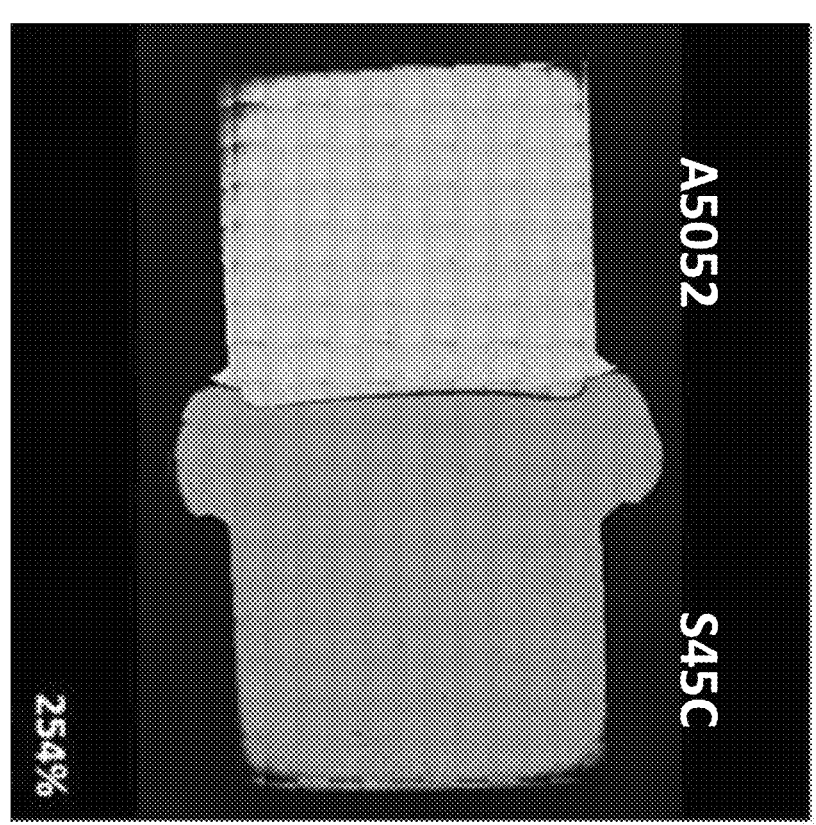
FIG. 8 is a cross-sectional photograph of the bonded portion obtained under Condition 3.

The cross-sectional photographs of the bonded portions obtained under Condition 1 to Condition 3 are shown in FIG. 6 to FIG. 8, respectively. It can be seen that the area of the bonded portion interface on the carbon material side is significantly increased by lengthening the tapered portion on the carbon steel material side. When the increasing rate of the bonded interface from the interface to be bonded before the bonding was calculated, the value was 200% or more under Conditions 2 and 3, and a good bonded portion where the aluminum alloy material and the carbon steel material were abutted in the newly formed surfaces over the entire bonded interface was formed. The increasing rates of the obtained interfaces to be bonded are shown in Table 1.

Figure 9:
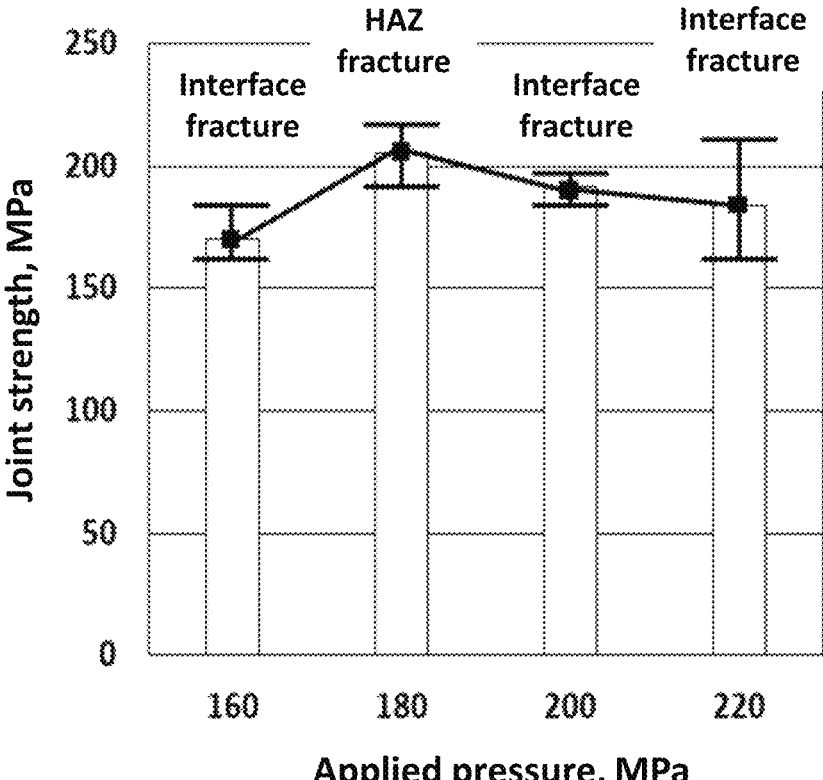
FIG. 9 is a graph showing the tensile test results of each joint obtained.

Next, in order to confirm the effect of the bonding pressure on the formation of the bonded portion, the aluminum alloy material and the carbon steel material were bonded under the same conditions as in Condition 3 except that the bonding pressure was set to 160 MPa, 200 MPa, and 220 MPa. A tensile test was performed on each of the obtained joints and the joint obtained under Condition 3 at the bonding pressure of 180 MPa, and the results shown in FIG. 9 were obtained.

The maximum joint strength is obtained when the bonding pressure is 180 MPa, and the joint efficiency for the aluminum alloy material reaches 90%. On the other hand, it can be seen that the joint strength decreased both when the bonding pressure was decreased (160 MPa) and when the bonding pressure was increased (200 MPa and 220 MPa). Here, when the bonding pressure was 180 MPa, fracture occurred at the heat-affected zone on the side of the aluminum alloy material in the vicinity of the bonding portion (base material fracture), and at the other bonding pressures, fracture occurred at the bonded interface.

Figure 10:
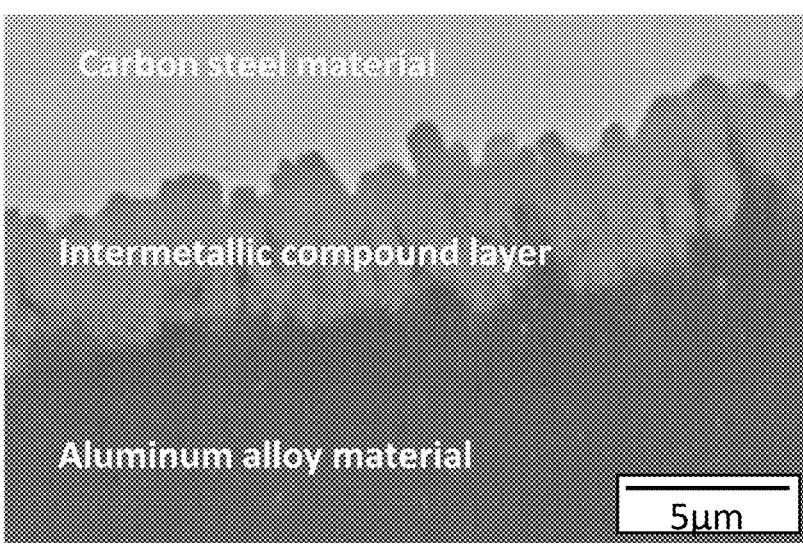
FIG. 10 is a SEM photograph of the cross section of the center of the bonded portion obtained at a bonding pressure of 180 MPa.
Figure 11:
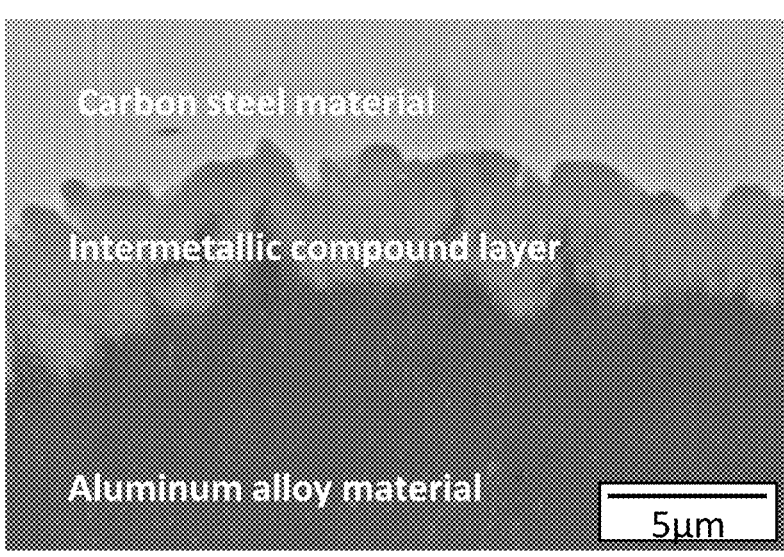
FIG. 11 is a SEM photograph of the cross section of the outer periphery of the bonded portion obtained at a bonding pressure of 180 MPa.

With respect to the cross section of the bonded portion obtained under Condition 3 at a bonding pressure of 180 MPa, FIG. 10 and FIG. 11 show the results of the SEM observation of the center of the bonded portion and the outer periphery of the bonded portion, respectively. Although the intermetallic compound layer was formed at the bonded interface, the thickness of the intermetallic compound layer at the center of the bonded portion and the thickness of the intermetallic compound layer at the outer periphery of the bonded portion were about the same, and ranged from 2 to 4 μm.

Figure 12:
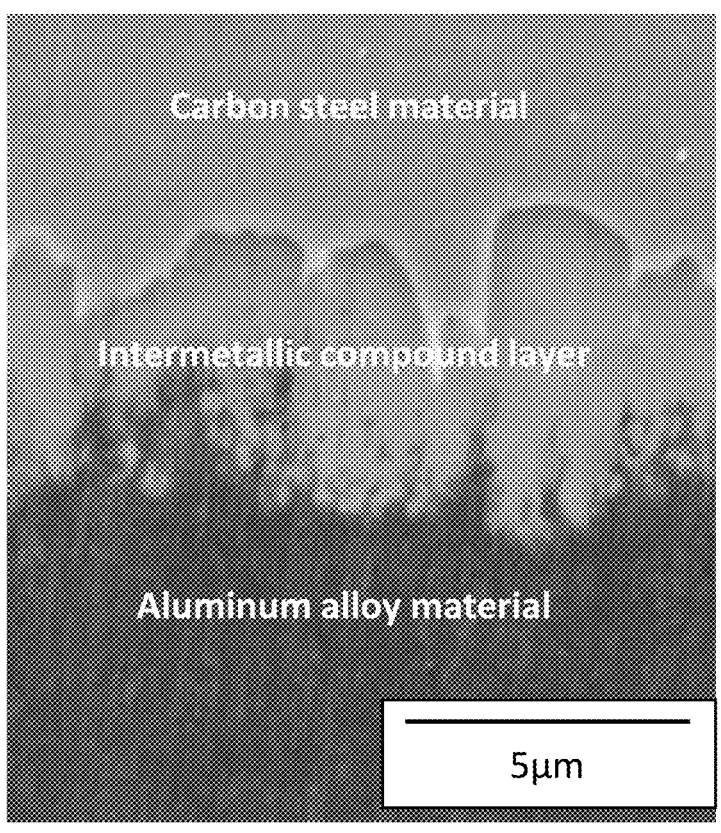
FIG. 12 is a SEM photograph of the cross section of the center of the bonded portion obtained at a bonding pressure of 160 MPa.

With respect to the cross section of the bonded portion obtained under Condition 3 at a bonding pressure of 160 MPa, FIG. 12 shows the results of the SEM observation of the center of the bonded portion. In comparison with the case where the bonding pressure is 180 MPa, a thicker intermetallic compound layer is formed, and the thickness is about 5 μm. From the results, the reason why the joint obtained at 160 MPa fractured at the bonded interface in the tensile test is seemed that the bonding temperature rose higher than the case where the bonding pressure was 180 MPa, and the brittle intermetallic compound layer became thicker.

Figure 13:
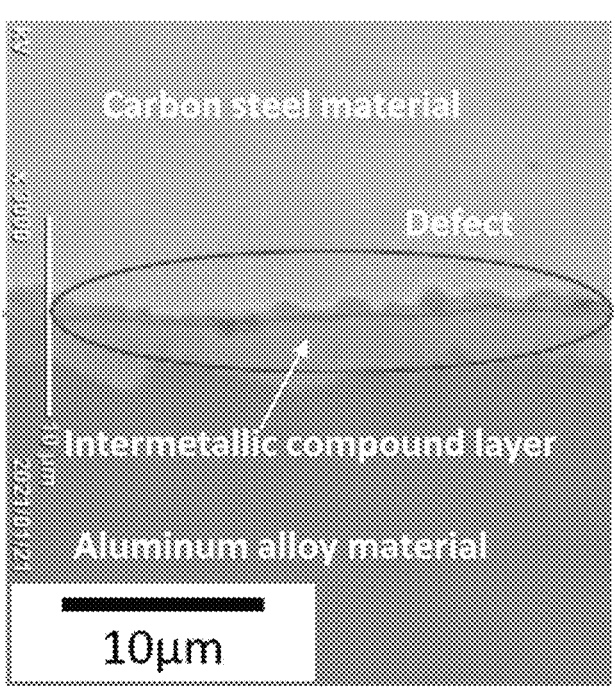
FIG. 13 is a SEM photograph of the cross section of the center of the bonded portion obtained at a bonding pressure of 200 MPa.
Figure 14:
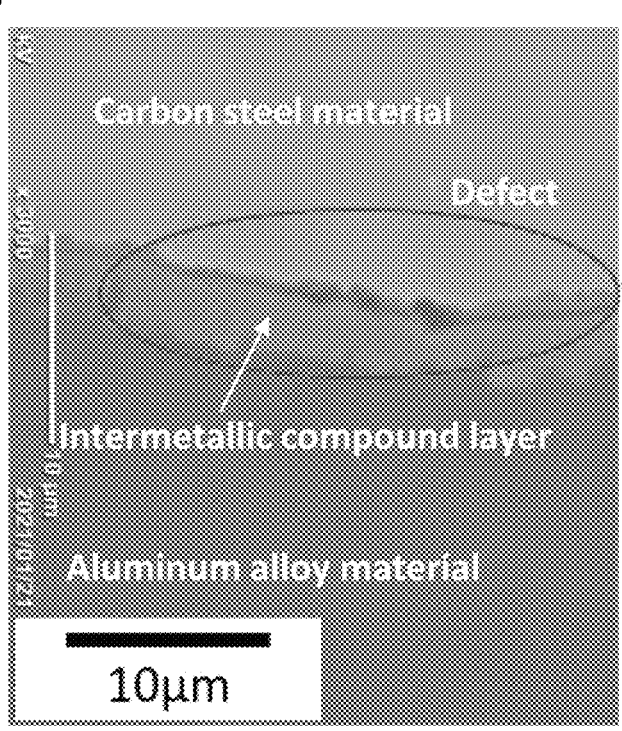
FIG. 14 is a SEM photograph of the cross section of the outer circumference of a bonded portion obtained at a bonding pressure of 200 MPa.

With respect to the cross section of the bonded portion obtained under Condition 3 at a bonding pressure of 200 MPa, FIG. 13 and FIG. 14 show the results of the SEM observation of the center of the bonded portion and the outer periphery of the bonded portion, respectively. Although an increase in the thickness of the intermetallic compound layer is suppressed, formation of cracks in the intermetallic compound layer and defects at the bonded interface are confirmed. It is considered that when the bonding pressure was 200 MPa, the bonding temperature was low, and flow of the materials and the like did not proceed smoothly at the interface to be bonded.

From the above results, when performing the dissimilar material solid phase bonding on the carbon steel and the aluminum alloy, for which there is no temperature at which the strength is substantially the same, it can be seen that it is important to control the respective temperatures of the carbon steel material and the aluminum alloy material in the vicinity of the interface to be bonded by the difference of electrical resistance, current density, and shape and size of the materials to be bonded, and the like to create the state where both the carbon steel material and the aluminum alloy material can deform. Further, in this state, by applying an appropriate bonding pressure that allows the carbon steel material and the aluminum alloy material to deform smoothly, and bringing the new surfaces of the carbon steel material and the aluminum alloy material into contact with each other at the interface to be bonded, a good dissimilar bonded portion can be obtained.

EXPLANATION OF SYMBOLS

2 . . . . One member,
4 . . . . Other member,
6 . . . . Interface to be bonded,
10 . . . . Dissimilar material bonded structure,
12 . . . . Solid phase bonded interface.

The invention claimed is:

1. A dissimilar material solid phase bonding method where one member is brought into contact with other member to form an interface to be bonded, and newly formed surfaces of the one member and the other member are formed at the interface to be bonded, by means of the application of a bonding load, characterized in that:
  the one member and the other member are brought into contact to form the interface to be bonded,
  the temperature of the interface to be bonded is raised by using ohmic heating by running current from the one member to the other member,
  the combination of the one member and the other member is different in electrical resistance, the temperature ($T_1$) of the one member and the temperature ($T_2$) of the other member in the vicinity of the interface to be bonded are set so as to differ from one another,
  the one member and the other member have substantially the same strength at the temperature ($T_1$) of the one member and the temperature ($T_2$) of the other member,
  the bonding load which applies the strength substantially perpendicular to the interface to be bonded is set, and
  the current density ($D_1$) for the one member and the current density ($D_2$) for the other member are set to different values in the ohmic heating.

2. The dissimilar material solid phase bonding method according to claim 1, wherein the length ($L_1$) of the one member and the length ($L_2$) of the other member are set to different values.

3. The dissimilar material solid phase bonding method according to claim 1, wherein the tip portion of the one member and/or the tip portion of the other member have a tapered shape, and the interface to be bonded is formed by the contact between the tip portions.

4. The dissimilar material solid phase bonding method according to claim 1, wherein the area ($S_1$) of the one member and the area ($S_2$) of the other member on the surface forming the interface to be bonded are set to different values.

5. The dissimilar material solid phase bonding method according to claim 1, wherein the burn-off length is set so that the new surfaces of the one member and the other member are formed in substantially the entire area of the interface to be bonded in the one member and/or the other member.

6. The dissimilar material solid phase bonding method according to claim 1, wherein the temperature $T_1$ and/or the temperature $T_2$ are created by subjecting the one member and/or the other member to external cooling and/or external heating.

7. The dissimilar material solid phase bonding method according to claim 1, wherein the one member is different from the other member in composition and/or structure.

8. A dissimilar material solid phase bonding method where one member is brought into contact with other member to form an interface to be bonded, and newly formed surfaces of the one member and the other member are formed at the interface to be bonded, by means of the application of a bonding load, characterized in that:
  the one member and the other member are brought into contact to form the interface to be bonded,
  the temperature of the interface to be bonded is raised by using ohmic heating by running current from the one member to the other member,
  the combination of the one member and the other member is different in electrical resistance,
  the temperature ($T_1$) of the one member and the temperature ($T_2$) of the other member in the vicinity of the interface to be bonded are set so as to differ from one another,
  the one member and the other member have substantially the same strength at the temperature ($T_1$) of the one member and the temperature ($T_2$) of the other member,
  the bonding load which applies the strength substantially perpendicular to the interface to be bonded is set,
  the one member is carbon steel material and the other member is aluminum alloy material, and
  there is no single temperature at which the strength of the one member is substantially the same as the strength of the other member in a range between 200° C. and 1000° C.

\* \* \* \* \*